United States Patent
Jiang et al.

(10) Patent No.: US 9,540,735 B2
(45) Date of Patent: Jan. 10, 2017

(54) ZINCATING ALUMINUM

(75) Inventors: Taixiang Jiang, Ottawa (CA); Xianyao Li, Ottawa (CA); Hieu Cong Truong, Ottawa (CA)

(73) Assignee: Royal Canadian Mint, Ontario (CA)

( * ) Notice: Subject to any disclaimer, the term of this patent is extended or adjusted under 35 U.S.C. 154(b) by 67 days.

(21) Appl. No.: 14/342,706

(22) PCT Filed: Sep. 11, 2012

(86) PCT No.: PCT/CA2012/050645
§ 371 (c)(1),
(2), (4) Date: Mar. 4, 2014

(87) PCT Pub. No.: WO2013/037071
PCT Pub. Date: Mar. 21, 2013

(65) Prior Publication Data
US 2014/0205856 A1 Jul. 24, 2014

Related U.S. Application Data

(60) Provisional application No. 61/534,334, filed on Sep. 13, 2011, provisional application No. 61/534,654, filed on Sep. 14, 2011.

(51) Int. Cl.
*C23C 18/16* (2006.01)
*C25D 5/44* (2006.01)
(Continued)

(52) U.S. Cl.
CPC ............ *C23C 18/1653* (2013.01); *A44C 21/00* (2013.01); *B32B 15/017* (2013.01); *C23C 18/54* (2013.01);
(Continued)

(58) Field of Classification Search
None
See application file for complete search history.

(56) References Cited

U.S. PATENT DOCUMENTS 4,499,123 A * 2/1985 Suzuki .................... C23C 18/31
427/282
5,139,886 A * 8/1992 Truong .................... C25D 5/12
40/27.5
(Continued)

FOREIGN PATENT DOCUMENTS

CA 2019568 A1 12/1991
CN 1057496 A 1/1992
(Continued)

OTHER PUBLICATIONS

Lin et al.; The Morphologies and the Chemical States of the Multiple Zincating Deposits on Al Pads of Si Chips; Thin Solid Films; 288 (1996) 36-40.*

(Continued)

*Primary Examiner* — Michael P Rodriguez
(74) *Attorney, Agent, or Firm* — Andrus Intellectual Property Law, LLP

(57) ABSTRACT

A method of treating aluminum or aluminum alloy includes providing an aluminum or aluminum alloy substrate; depositing a first zincating layer on the substrate by zincate immersion; stripping off the first zincating layer; depositing a second zincating layer on the substrate by zincate immersion; stripping off the second zincating layer; and depositing a third zincating layer on the substrate by zincate immersion.

9 Claims, 17 Drawing Sheets

(51) Int. Cl.

| | |
|---|---|
| *C23C 28/00* | (2006.01) |
| *C25D 5/14* | (2006.01) |
| *C25D 5/50* | (2006.01) |
| *C23C 18/54* | (2006.01) |
| *A44C 21/00* | (2006.01) |
| *B32B 15/01* | (2006.01) |
| *C25D 17/16* | (2006.01) |

(52) U.S. Cl.
CPC ........... *C23C 28/321* (2013.01); *C23C 28/322* (2013.01); *C23C 28/345* (2013.01); *C25D 5/14* (2013.01); *C25D 5/44* (2013.01); *C25D 5/50* (2013.01); *C25D 17/16* (2013.01); *Y10T 428/12736* (2015.01)

(56) References Cited

U.S. PATENT DOCUMENTS

| | | | |
|---|---|---|---|
| 5,151,167 A | 9/1992 | Truong et al. | |
| 6,656,606 B1 * | 12/2003 | Morin | C25D 5/44 428/27.5 |
| 6,692,630 B2 | 2/2004 | Morin et al. | |
| 2009/0133782 A1 * | 5/2009 | Uchida | C23C 18/1601 148/275 |
| 2012/0202090 A1 * | 8/2012 | Yamamoto | B23K 1/19 428/651 |

FOREIGN PATENT DOCUMENTS

| | | | |
|---|---|---|---|
| CN | 1498288 | | 5/2004 |
| CN | 1498288 A | | 5/2004 |
| EP | 0163419 A2 | | 12/1985 |
| EP | 0450883 A2 | | 10/1991 |
| JP | S6111895 A | | 1/1986 |
| JP | H0535963 A | | 2/1993 |
| JP | H0688289 A | | 3/1994 |
| JP | 2004134310 A | | 4/2004 |
| JP | 2007254866 A | | 10/2007 |
| JP | WO 2011052517 A1 * | 5/2011 | ............... B23K 1/19 |
| WO | 0214583 | | 2/2002 |
| WO | 0214583 A2 | | 2/2002 |
| WO | 2004101854 A2 | | 11/2004 |

OTHER PUBLICATIONS

Lin et al., "The morphologies and the chemical states of the multiple zincating deposits on Al pads of Si chips," Thin Solid Films, 1996, 288:36-40.
Office Action for CN201280044594.5 dated Nov. 9, 2015.
European Communication for EP 12831704.7 dated May 15, 2015 and European Search Report for EP 12831704.7 dated May 4, 2015.
"Adhesion of Electroless Nickel Deposits to Aluminum Alloys", Products Finishing, Jan. 7, 1999.
The morphologies and the chemical states of the multiple zincating deposits on Al pads of Si chips, Lin K. et al., 1996, vol. 288, no1-2, pp. 36-40, National Cheng Kung University, Tainan 701, Taiwan, Provice De Chine, entire document.
Adhesion of Electroless Nickel Deposits to Aluminum Alloys Article. Products Finishing, Don Baudrand, Posted on: Jul. 1, 1999. <URL: http://pfonline.com/articles/adhesion-of-electroless-nickel-deposits-to-aluminum-alloys>. p. 3.
Physical Properties Evaluation of Annealed ZnAl2O4 Alloy Thin Films, Digest Journal of Nanomaterials and Biostructures vol. 7, No. 3, Jul.-Sep. 2012, p. 1315-1325, entire document.
International Search Report for PCT/CA2012/050645 dated Nov. 13, 2012.
International Preliminary Examining Authority dated Jan. 14, 2014.
Lin, Kwang-Lung, et al., "The morphologies and the chemical states of the multiple zincating deposits on Al pads of Si chips", Thin solid films, vol. 288, pp. 36-40, Nov. 1996.
Second Office Action for CN 201280044594.5 dated May 31, 2016 with English Translation.
Notification of Reasons for Refusal for JP 2014-530061 dated Jul. 29, 2016 with English Translation.

* cited by examiner (a)                (b)

(a)

(b)

(c)

ZINCATING ALUMINUM

CROSS-REFERENCE TO RELATED APPLICATIONS

This application is the U.S. national stage application of international Application PCT/CA2012/050645, filed Sep. 11, 2012, which international application was published on Mar. 21, 2013, as International Publication WO2013/037071 in the English language. International Publication '071 claims the benefit of and priority from U.S. Provisional Application 61/534,334, filed Sep. 13, 2011 and U.S. Provisional Application 61/534,654, filed Sep. 14, 2011. The international application and both provisional applications are incorporated herein by reference, in entirety.

FIELD

The present disclosure relates generally to the field of coating aluminum. More particularly, the present disclosure relates to zincating aluminum as a coating pre-treatment.

BACKGROUND

While much of the discussion herein relates to coating coins, this is merely one example of a substrate.

While much of the discussion herein relates to coating aluminum, this is meant to include coating aluminum or aluminum alloys.

There is an increasing demand for alternative low cost coinage materials which can maintain and/or increase security features and which are durable for use as circulation coins. Aluminum is one of the most promising candidate core materials due to its availability, low cost, lightweight, and excellent physical and chemical properties. Although aluminum is used as coin material in many countries, these coins have shown poor wear resistance and very low durability in the circulation environment. Some of the aluminum coins become dark and corroded shortly after being released for circulation. These corroded coins contaminate consumers' personal belongings. Henceforth, it is expected that plating metal(s) onto an aluminum substrate will provide enhanced wear resistance and more durability to the aluminum substrate.

It is well known that electro-plating on aluminum is much more difficult than plating on other metals such as steel or copper alloys. A major problem in plating aluminum is the difficulty in achieving good coating adhesion, particularly when using barrel plating. This is due to the fact that an aluminum oxide film tends to form on the aluminum surface immediately when the surface is exposed to air or water. This oxide film is detrimental to the plating process as it acts as a barrier to prevent direct metallic bonding between the plating and the aluminum core, thus resulting in poor adhesion between the plating and the substrate. Special pre-treatments have been developed to address the poor adhesion such as etching to remove the oxide, anodizing to create a rough surface, and pre-depositing to cover the oxidized surface, including electroless nickel plating and zincating in which an immersion deposit of zinc is produced.

In different simple zincating processes such as those described in ASTM B253-87 "Preparation of Aluminum Alloys for Electroplating", different steps, including a zincating immersion solution containing elements such as zinc, copper, nickel, and complexing agents of cyanide and tartrate, are required for different aluminum alloys which results in an inconsistent adhesion between the plating and the substrate. For example, different zinc immersion solutions and procedures are recommended when sodium hydroxide and zinc oxide are mainly used with different additives under different conditions. Upon completion of the zincating step, either by the single or double zincating process, other pre-coating processes are applied. These processes include for example, cyanide copper striking, neutral nickel strike and electroless nickel, etc.

U.S. Pat. No. 6,692,630 to Morin et al. ("Morin") discloses a two step zincating pretreatment for plating aluminum parts in a small barrel plating process. Morin describes a zincating process similar to the zincating process described in the ASTM B253-87 reference. According to Morin, the improvement in terms of better adhesion is due to the addition of potassium cyanide which acts as a complexing agent and a solution activator in the zincating process. Furthermore, no matter what metal plating on aluminum is undertaken, be it pure copper plating, copper alloy (brass or bronze) plating, or nickel plating, a copper layer strike is particularly emphasized, and is considered as a must for adhesion according to Morin. The copper layer strike in Morin, is plated using a cyanide copper striking bath.

In coinage materials, non-cyanide plating technology, as described in the U.S. Pat. No. 5,151,167 to Truong et al. ("Truong1") and U.S. Pat. No. 5,139,886 to Truong et al. ("Truong2"), has been welcomed by many countries and is commercially available. Coins struck from the non-cyanide and multi-ply plating technology have been in circulation in many countries and have proved to be durable, secure, and cost competitive. In the multi-ply coin structure, nickel, copper and then another nickel layer are coated onto low carbon steel using an automatic loading and computer controlled process, which is cyanide free.

SUMMARY

Embodiments described herein relate to the triple zincating of aluminum (e.g. a coin) as a pre-treatment for plating on aluminum or aluminum alloys. The plating may comprise one or more metal or metal alloys, and may be performed without the use of cyanide.

In a first aspect, the present disclosure provides a method of treating aluminum or an aluminum alloy. The method includes: providing an aluminum or aluminum alloy substrate; depositing a first zincating layer on the substrate by zincate immersion; stripping off the first zincating layer; depositing a second zincating layer on the substrate by zincate immersion; stripping off the second zincating layer; and depositing a third zincating layer on the substrate by zincate immersion.

After depositing the third zincating layer, the method may include plating the substrate. The plating may be effected in the substantial absence of cyanide. The plating may include the use of cyanide.

The plating may include barrel plating. The plating may include plating one or more layers of metal or metal alloys. The plating may be effected over an entire surface of the substrate. Prior to plating, the method may include applying live current to a plating barrel to assist adhesion of a first plating layer to the substrate.

After plating, the method may include annealing to create a metallic diffusion between the substrate and plating layers to assist adhesion. Annealing may be effected between 400 and 600° C. Annealing may be effected between 425 and 450° C.

The immersion may be effected for 10 to 120 seconds. The immersion may be effected for 15 to 60 seconds.

The substrate may be a coin blank.

The method may additionally include, after depositing the third zincating layer, stripping off the third zincating layer, and depositing a fourth zincating layer on the substrate by zincate immersion.

In another aspect, the present disclosure provides an aluminum or aluminum alloy having a coating. The coating includes: a first zincating layer applied via zincating the aluminum or aluminum substrate, which first zincating layer has been stripped off; a second zincating layer applied via zincating the stripped off first zincating layer, which second zincating layer has been stripped off; and a third zincating layer applied via zincating the stripped off second zincating layer.

In still another aspect, the present disclosure provides an aluminum or aluminum alloy substrate having a coating. The coating includes a triple zincating layer which has a density of greater than about 7.5 g/cm³.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Generally, embodiments described herein relate to at least triple zincating of aluminum (e.g. a coin) as a pre-treatment for plating. The plating may comprise one or more metal or metal alloys, and may be performed without the use of cyanide.

Figures 1A, 1B:
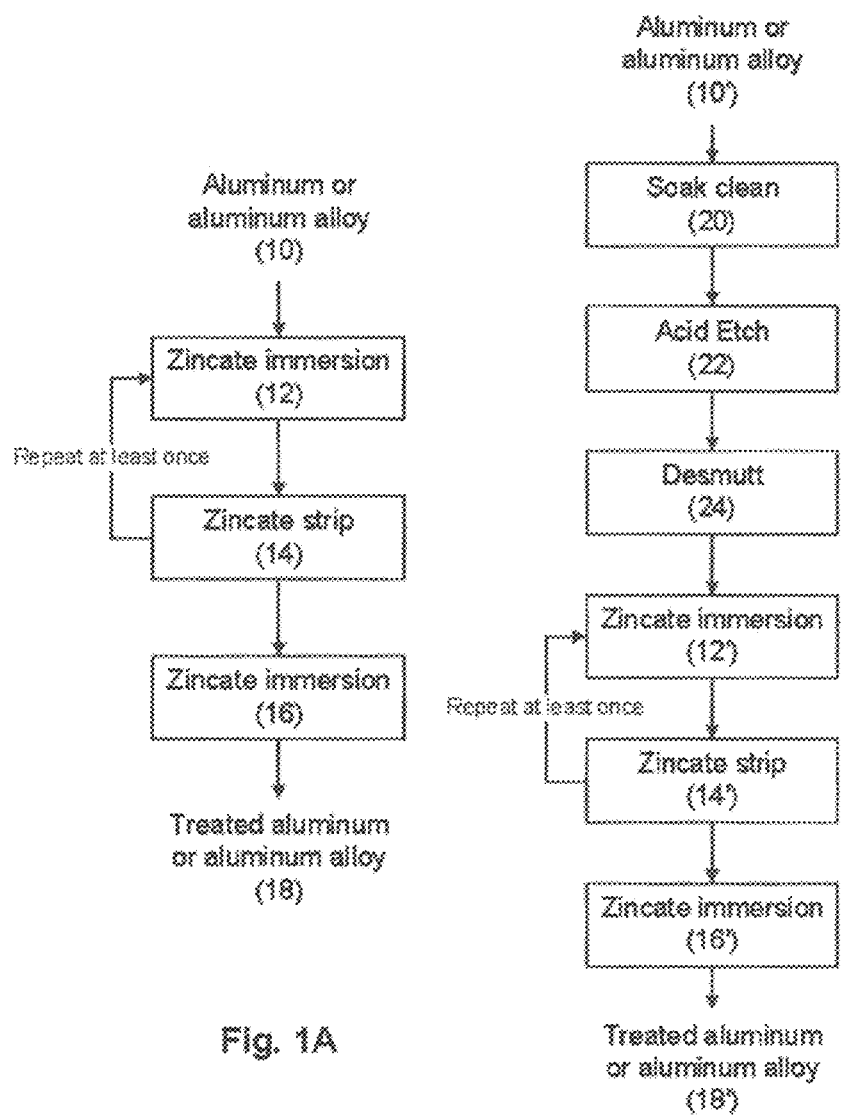
FIGS. 1A-C are flowcharts illustrating methods of electroplating onto aluminum without using cyanide in accordance with the disclosure.

One embodiment is illustrated in FIG. 1A, which shows a flow chart for treating aluminum or aluminum alloy (10). The aluminum or aluminum alloy (10) is triple zincated by first immersing the aluminum or aluminum alloy (10) in zincate solution (12). The resulting zincating layer is stripped off (14) using a zincate stripping solution. The immersion and stripping steps (12, 14) are repeated at least once and the resulting material is immersed in a final zincate immersion (16), for a total of at least three zincating immersions, resulting in treated aluminum or aluminum alloy (18).

The zincate immersion results in the creation of a very thin layer of zinc over the aluminum substrate according to the equation:

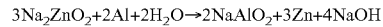

$$3Na_2ZnO_2 + 2Al + 2H_2O \rightarrow 2NaAlO_2 + 3Zn + 4NaOH$$

The zinc is quickly converted to the more stable zinc oxide which is insoluble in water according to the equation:

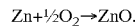

$$Zn + \tfrac{1}{2}O_2 \rightarrow ZnO.$$

This zinc-zinc oxide layer is known as a "zincating layer", "zincate layer", or "zincate deposit". The zincating layer may be controlled for uniformity of size. Dense and compact formation is desired over coarse and large size to avoid (or limit) porosities which are venues of attack of the acidic, or neutral, non-cyanide plating bath.

The expression "zincating" refers to the immersion of a substrate into a solution of zincate, which results in a zincating layer. "Double" zincating refers to zincating a substrate, stripping the zincating plated substrate using a stripping solution, and zincating the stripped substrate such that there are a total of two zincating steps. "Triple" zincating similarly refers to a process with three zincating steps and two stripping steps.

Zincate solutions, also referred to as zincating solutions, are known in the art. A zincating solution includes sodium hydroxide and zinc oxide, zinc chloride, or both. Modifications to such a zincating solution may include addition of a complexing agent such as cyanide or tartarte; addition of other metals such as cooper, nickel, or iron. Certain zincating solutions which are used in methods according to the present disclosure may exclude cyanide. Examplary zincate solutions are discussed in ASTM B253-87 ("Standard Guide for Preparation of Aluminum Alloys for Electroplating") and in U.S. Pat. No. 6,656,606 ("Electroplated aluminum parts and process of production" to Louis Charles Morin et al).

Zincate stripping solutions, also referred to as stripping solutions, are acidic solutions which remove zincating plated substrate. One example of a zincate stripping solution is a 50% by volume nitric acid solution. Other exemplary zincate stripping solutions do not include nitric acid and may be fume-free.

The treated aluminum or aluminum alloy (18) may be used as a coin blank substrate. The coin blank substrate may subsequently include a multi-ply plating structure on top of the zincating layer, followed by a post annealing process of the whole coin blank. The triple zincating is purposed to assist adhesion of the metallic electroplating coating(s) to the aluminum or aluminum alloy substrate.

Figure 1C:
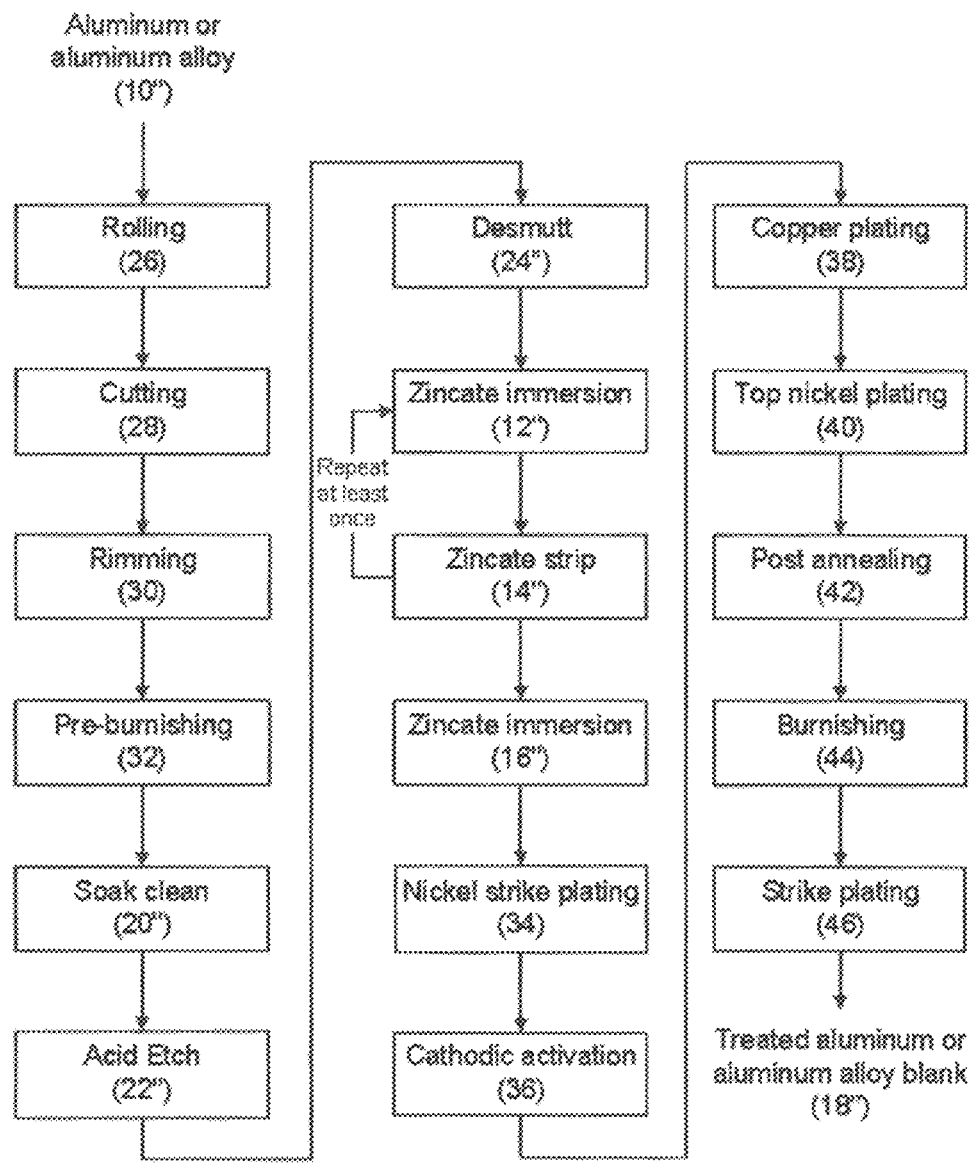

FIG. 1B shows a flow chart illustrating another embodiment of treating aluminum or aluminum alloy (10') without using cyanide. The embodiment illustrated in FIG. 1B includes the steps illustrated in FIG. 1A as well as additional steps, as described below. Another embodiment is illustrated in FIG. 1C, which is subsequently described in greater detail.

Soak Cleaning (20): The aluminum or aluminum alloy (10') is soak cleaned (20). The solution is made-up from Alklean 11™ (Cl) (Atotech, Berlin, Germany) (45 g/L) and is a highly effective soak cleaner for fast removal of oil, grease and soil deposits on aluminum alloys. The bath temperature is in the range of 50-89° C. and soak time is between 1-10 min.

Acid Etching (22): The cleaned aluminum or aluminum alloy is acid etched (22). The solution is made from Alklean AC-2™ (50 ml/L) (Atotech, Berlin, Germany). The solution is used for cleaning and removing the oxide layer that quickly forms on the surface of the aluminum when in contact with air or water. Its mild etching action provides a uniform etching that is readily modified with adjustments to temperature and concentration. The bath temperature is in the range of 13-38° C. and immersion time is between 30 seconds and 2 minutes.

Desmutt (24): The acid etched aluminum or aluminum alloy is immersed in a desmutt solution (24). The solution is made from Desmutter NF 2™ (90 g/L) (Atotech, Berlin, Germany) and is nitric acid-free. The purpose of this step is to remove insoluble residues (smuts) left by the previous etching step and to leave a uniform, thinly oxidized aluminum rich surface for zincate immersion. Smut is basically the residues that keeps sticking to the surface of the aluminum because they are insoluble in the acid etch solution. Desmutter NF 2 quickly dissolves undesirable smuts and is much less aggressive on aluminum substrates than nitric acid-based processes. The operating temperature is in the range of 18-35° C. and immersion time is between 30 seconds and 3 minutes.

Zincate immersion (12'): The desmutted aluminum or aluminum alloy is immersed in a zincate solution (12'). The purpose of zincate immersion is to apply a barrier layer to prevent (or limit) reoxidation of the active aluminum surface. Immersion in the zincate solution causes dissolution of aluminum and deposition of a thin layer of zinc:

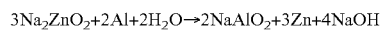

$3Na_2ZnO_2 + 2Al + 2H_2O \rightarrow 2NaAlO_2 + 3Zn + 4NaOH$

As discussed above, this zinc is converted to zinc oxide and forms a zincating layer (i.e. a zinc-zinc oxide layer).

The zincate immersion solution is made from Alumseal NCY-X2™ (240 ml/L) (Atotech, Berlin, Germany) which is a non-cyanide solution designed specifically to facilitate plating of metallic deposits on aluminum alloys. Alumseal NCY-X2 applies a thin, dense zincating layer that can be subsequently plated with copper, nickel, electroless nickel, and other metals. The operating temperature is in the range of 18-43° C. and immersion time is between 15 and 120 seconds.

Zincate Stripping (14'): The zincating plated aluminum or aluminum alloy is stripped (14') using a stripping solution. In the double zincate immersion process, two zincating steps are required. After the first zincating operation, the first zincating layer is stripped off. This step removes surface impurities, and leaves a uniform white surface. Some of the zincating layer remains, leading to better adhesion of zinc to Al substrate. After stripping the first zincating layer, a second zincating layer is applied. This second zincating will ensure a denser zincating layer. The second zincating layer is also stripped before the third zincate immersion.

The new stripping solution used was made from Activator BD (50 g/L) (Atotech, Berlin, Germany) and $H_2SO_4$ (1.5% by volume). The operating temperatures are in the range of 21-26° C. and the immersion time is between 30 seconds and 3 minutes.

Third Zincate immersion (16'): The stripped second zincating layer is immersed in a zincate solution (16'). The solution is made from Alumseal NCY-X2™ (240 ml/L) (Atotech, Berlin, Germany) which is a non-cyanide solution designed specifically to facilitate plating of metallic deposits on aluminum alloys. Alumseal NCY-X2 applies a thin, dense zincating layer that can be subsequently plated with copper, nickel, electroless nickel, and other metals. The operating temperature is in the range of 18-43° C. and immersion time is between 15 and 120 seconds.

A triple zincating layer is thinner, more dense, has smaller grain size, and/or has better coverage of the substrate surface as compared to a double zincating layer. In particular examples, a triple zincating layer may be less than 100 nm. In other examples, a triple zincating layer may be less than 70 nm. In yet other examples, a triple zincating layer may be less than 20 nm. In particular examples, the triple zincating layer has a thickness of about 20 nm, and the triple zincating layer has a weight of more than 15 μg/cm², that is, the density is greater than about $15 \times 10^{-6}$ g/$20 \times 10^{-7}$ cm³=7.5 g/cm³. In other particular examples, the triple zincating layer has a thickness of about 70 nm, and the triple zincating layer has a weight of more than 50 μg/cm²; that is, the density is greater than about $50 \times 10^{-6}$ g/$70 \times 10^{-7}$ cm³=7.14 g/cm³.

Development Work after Zincating

The inventors tried to use alkaline electroless nickel, which was less corrosive to the zincating layer than acidic electroless nickel, to plate a thin layer of adherent nickel on aluminum alloys, and then use acidic electroless nickel to build a thicker layer of protective coatings. The use of acidic electroless nickel provides additional protection of the aluminum prior to the electroplating of copper and nickel. However, it was found that the electroless nickel did not provide good coinability during the minting process as it was brittle and was not sufficiently malleable for material deformation upon stamping of coins. Furthermore, the electroless nickel did not provided sufficient adhesion.

Development Work Leading to Embodiments Described Herein

The inventors have found that triple zincating provides excellent bonding between a zincated aluminum base and the top plated layer(s) without any need for a copper cyanide strike.

Triple zincating may ensure no delamination and flaking (or limit delamination and flaking) of the multi-layer plating or single-layer plating on top of the aluminum surface after zincating. In one embodiment, a fourth zincating step does not affect adhesion of the next metal layer plating to the aluminum surface following zincating. A fourth zincating may not be economically feasible and is optional. In another embodiment, further zincating steps (fifth zincating step, sixth zincating etc.) may be included, but these additional steps are optional.

Extensive scientific in-depth analysis of the mechanism of how a zincating layer provides the necessary base for the diffused intermetallic layer which assures excellent bonding between the aluminum substrate and the first plating layer is provided in Appendix A. The work through the SEM-EDX shows that it is a dense, uniform layer of zinc-zinc oxide which covers the surface of aluminum which ensures excellent adhesion of the plated metals to the aluminum substrate.

Zinc is quickly converted to zinc oxide because zinc is reactive and easily oxidized to zinc oxide. The zinc oxide layer is more stable and the zinc-zinc oxide (i.e. the zincating layer) provides better protection of the aluminum core. The oxygen presence in the very thin layer of zinc obtained in zincating is beyond the ability of EDX to identify. Upon triple zincating, the presence of zinc-zinc oxide and significantly less aluminum is clearly identified by XPS. Full coverage of zincate provides better protection of the aluminum core.

The third zincating step provides a uniform dense layer of zincate; it provides a protective layer against oxidation of aluminum and the direct attack and dissolution of the aluminum substrate leading to poor or weak adhesion of first plated metal to the aluminum base. Accordingly, acidic, non cyanide, nickel sulfamate may be used to plate another metal directly, e.g. nickel on aluminum, with excellent adhesion, for instance for coining purposes. To further enhance the preventive dissolution of the zincating layer, a live current may be used to the plating barrel, just prior to the immersion of the plating barrel into the first metal plating bath.

The two zincating steps disclosed in Morin are insufficient for good adhesion in coinage applications. In fact, the attempt to replicate and obtain a satisfactory coin blank for coinage use following the two-step zincating process of Morin by the present inventors yielded repeated failures due to flaking of subsequent plated layers. Coin blanks produced following the teachings of Morin failed consistently when cyanide free, acidic plating baths were used by the present inventors, or when electroless nickel was used after zincating.

In one embodiment, a nitric acid free triple zincating process is used to pre-treat aluminum. Cyanide plating solutions are not required. Triple zincate immersion forms a more uniform and dense zincating layer as well as improves the adhesion of the plated metals. It was found that the zincating layer is in the form of the more stable zinc oxide layer according to the X-ray photo-electron spectroscopy analysis done after zincating. The triple zincating allows one to use an acidic nickel solution (sulfamate or sulfate) as the next step, followed by acidic copper. Although not recommended due to safety concerns, multi-ply plating can also be done by a combination of cyanide copper and acidic nickel.

Acidic copper is mentioned in order to avoid using cyanides, but copper alloys or copper cyanides can also be used. Other plating layers can be deposited on top of copper as desired.

In one embodiment, the process further comprises a post annealing treatment to further enhance the bonding of the plating and the substrate, to recrystallize the plating microstructure of the copper and nickel layers as well to de-gas entrapped gases generated during the plating process. This post annealing process also relieves internal stress built during the plating process. Depending upon the annealing temperature and time, an intermediate diffusion layer can also be formed between the aluminum substrate and the nickel plating. The thickness of the diffusion layer is dependent upon the annealing temperature and annealing time, which can be very beneficial to the bonding and adhesion of the plating to the substrate. Furthermore, the present inventors have found that by controlling the post annealing temperature, one can obtain a unique electromagnetic signature of the multi-ply plated aluminum system due to several factors, such as the presence of nickel, copper, the diffused layers obtained after annealing, and the controlled micro-structuring of plated copper and nickel upon annealing.

According to one embodiment, upon completion of the sulfamate strike nickel layer, the other metallic layers, such as brass, bronze, silver, etc., may be deposited using electroplating solutions comprising acidic, alkaline, cyanide, non-cyanide, neutral or slightly basic electroplating solutions. Preferably, the plating is done using a non-cyanide electroplating solution.

EXAMPLES

A series of experiments were performed to develop and optimize key parameters such as the precleaning, zincating time and thickness, nickel sulfamate striking, annealing temperature, and annealing time, etc.

Barrel Plating of Aluminum Blanks

In barrel plating, aluminum blanks are loaded, rotated and tumbled during the plating process under various conditions. Two kinds of aluminum alloys, namely Al 5052 and Al 3003, were used as substrate materials for blanks. A flowchart illustrating an exemplary method of electroplating onto aluminum is shown in FIG. 1C. As mentioned earlier, the blanks were prepared following several steps including: rolling (26), cutting (28), rimming (30), and pre-burnishing (32). Prior to the plating trial(s), the blanks were pre-burnished in a 25 gallon (95 L) tumbler with 18 oz (0.53 L) FM403™ (Oaklite, Stow, Ohio, USA) and small media for 20 minutes and then rinsed in cold water twice and fully dried with a towel. Afterwards, the blanks were loaded into the plating barrel and then underwent a series of pre-treatment and plating process including: soak clean (20"), acid etch (22"), triple zincate immersion (that is, zincate immersion (12") and stripping (14"), repeated again, followed by: zincate immersion (16")); nickel strike plating (34), for example using a sulfamate nickel plating process; cathodic activation of the nickel (36); copper plating (38); and top nickel plating (40) (per FIG. 1C). Two rinsing steps were used between each process steps using de-ionized water. The duration of the nickel and copper plating depended on the desired thickness of the metal layers. After the nickel strike plating (34) was completed, 10 blanks were quickly removed from the barrel for different tests such as adhesion, surface roughness, and morphology observation. If the coating adhesion of the nickel strike layer was acceptable, the remaining blanks in the barrel were rinsed with de-ionized water, activated in 10% $H_2SO_4$ solution and continued to be plated with copper. After the copper plating was finished, another 10 blanks were removed from the barrel for the same tests. If the appearance and adhesion of the copper layers were good, the remaining blanks in the barrel were plated (38) with a top nickel layer in the same nickel plating bath. The top nickel plated blanks may be post annealed (42), burnished (44) and strike plated (46) in order to produce treated aluminum or aluminum alloy blanks (18"), as illustrated in FIG. 1C.

At first, the inventors tried to reproduce the aluminum plating conditions published in the literature, i.e., 1) the traditional practice, using a double zincating pre-treatment; 2) double zincating followed by electroless nickel plating in barrel plating. The results of the adhesion tests on all those attempts were poor and the coatings failed either after plating or upon coin striking.

Table 1 shows the results of the three barrel plating trials with Al 5052 aluminum coin blanks using the present process including triple zincating. The loadings for all of the three trials were 150 pieces. It is shown that the nickel strike layers had a very good adhesion for all three barrel plating trials when triple zincate immersion and sulfamate nickel strike were used. The results also indicated that the use of cathodic activation in diluted sulphuric acid (5-10% $H_2SO_4$ by volume) was beneficial prior to the copper plating for aiding adhesion of copper over the nickel strike layer. As shown in Table 2, a very good adhesion of a multi-ply plating of nickel strike, copper layer and top nickel layer was also achieved in a barrel plating trial with Al 3003 aluminum blanks. It is proven that the triple zincate immersion and sulfamate nickel strike process was effective for plating of different aluminum substrates, and the triple zincate immersion results in increased adhesion of the plating to the substrate either in a format of mono-nickel layer or in a format of multi-ply nickel-copper-nickel. Neither electroless nickel plating nor cyanide striking was needed in the plating on aluminum substrates.

TABLE 1

Barrel plating conditions of aluminum blanks of 23.47 mm (Al 5052 blanks, 150 pieces) [s: seconds, m: minutes]

| Steps | Example 1 | Example 2 | Example 3 |
|---|---|---|---|
| Blank loadings | Al 5052 blanks, 150 pieces | Al 5052 blanks, 150 pieces | Al 5052 blanks, 150 pieces |
| Soak clean | 71° C., 8 min | 71° C., 8 min | 71° C., 8 min |
| Acid etch | Room temp, 30 s | Room temp, 30 s | Room temp, 50 s |
| Desmutt | Room temp, 30 s | Room temp, 30 s | Room temp, 50 s |
| First Zincate | Room temp, 30 s | Room temp, 30 s | Room temp, 30 s |
| Zincate strip | Room temp, 20 s | Room temp, 20 s | Room temp, 20 s |
| Second Zincate | Room temp, 20 s | Room temp, 20 s | Room temp, 20 s |
| Zincate strip | Room temp, 20 s | Room temp, 20 s | Room temp, 20 s |
| 3rd Zincate | Room temp, 15 s | Room temp, 15 s | Room temp, 15 s |
| Sulfamate nickel strike | 38° C., 0.67 A/dm², 60 min | 38° C., 0.67 A/dm², 100 min | 38° C., 0.67 A/dm², 100 min |
| Cathodic activation | — | 5% $H_2SO_4$, 0.7 A/dm², carbon anode, 180 s | 10% $H_2SO_4$, 0.7 A/dm², carbon anode, 120 s |
| Copper plating | Room temperature, 0.67 A/dm², 80 min | Room temperature, 0.74 A/dm², 150 min | Room temperature, 0.74 A/dm², 160 min |
| Top nickel (same tank as nickel strike) | — | 38° C., 0.60 A/dm², 140 min | 38° C., 0.65 A/dm², 130 min |
| Adhesion | Nickel strike: very good Copper plating: very bad | Nickel strike: very good Copper plating: good Top nickel: good | Nickel strike: very good Copper plating: good Top nickel: good |

TABLE 2

Barrel plating conditions of Al 3003-H19 aluminum blanks

| Steps | Example 4 | Example 5 |
|---|---|---|
| Blank loadings | Al 3003-H19 blanks, 250 pieces | Al 3003-H19 blanks, 250 pieces |
| Soak clean | 71° C., 8 min | 71° C., 8 min |
| Acid etch | Room temp, 50 s | Room temp, 50 s |
| Desmutt | Room temp, 50 s | Room temp, 50 s |
| First Zincate | Room temp, 30 s | Room temp, 30 s |
| Zincate strip | Room temp, 20 s | Room temp, 20 s |
| Second Zincate | Room temp, 20 s | Room temp, 20 s |
| Zincate strip | Room temp, 20 s | Room temp, 20 s |
| 3rd Zincate | Room temp, 15 s | Room temp, 15 s |
| Sulfamate nickel | 38° C., 0.67 A/dm², 180 min | 38° C., 0.67 A/dm², 100 min |
| Cathodic activation | — | 10% $H_2SO_4$, 1.1 A/dm², carbon anode, 120 s |
| Copper plating | — | Room temperature, 0.74 A/dm², 160 min |
| Top nickel | — | 38° C., 0.77 A/dm², 100 min |
| Adhesion | Nickel strike: very good | Nickel strike: very good Copper plating: very good Top nickel: very good |

In order to evaluate and validate the capability of a process according to an embodiment for large loads of coin blanks and further optimize the process, additional barrel plating trials with larger blank loadings were also performed with Al5052 aluminum blanks (Table 3). In the plating trial of Example 6, the plating conditions basically were the same as shown in Table 1 except for the large blank loading. In plating trial in Example 7, not only the loading volume of blanks were increased, but also the duration time of soak clean was significantly reduced, and the duration time for acid etch, desmutt, zincate and zincate strip were increased. It was important to notice that, an excellent adhesion of nickel strike was achieved on aluminum blanks in both cases, indicating the triple zincate immersion and nickel sulfamate nickel strike processes were effective for the barrel plating of aluminum blanks under a wide range of conditions.

TABLE 3

Barrel plating conditions of aluminum blanks (Al 5052 blanks, 500 pieces)

| Steps | Example 6 | Example 7 |
| --- | --- | --- |
| Blank loading | Al 5052 blanks, 500 pieces | Al 5052 blanks, 500 pieces |
| Soak clean | 71° C., 8 min | 71° C., 4 min |
| Acid etch | Room temp, 50 s | Room temp, 90 s |
| Desmutt | Room temp, 50 s | Room temp, 2 min |
| First Zincate | Room temp, 30 s | Room temp, 60 s |
| Zincate strip | Room temp, 20 s | Room temp, 60 s |
| Second Zincate | Room temp, 20 s | Room temp, 40 s |
| Zincate strip | Room temp, 20 s | Room temp, 40 s |
| 3rd Zincate | Room temp, 15 s | Room temp, 30 s |
| Sulfamate nickel | 38° C., 0.5 A/dm$^2$, 100 min | 38° C., 0.5 A/dm$^2$, 100 min |
| Cathodic activation | 10% H$_2$SO$_4$, 0.8 A/dm$^2$, carbon anode, 120 s | — |
| Copper plating | Room temperature, 0.6 A/dm$^2$, 150 min | — |
| Top nickel | 38° C., 0.5 A/dm$^2$, 120 min | — |
| Adhesion | Nickel strike: very good; Copper plating: very good Top nickel: very good | Nickel strike: very good |

The Role of Triple Zincate Immersion

The triple zincate immersion effect significantly improves the adhesion of the first metal strike layer to the substrate. With triple zincating, one can use acidic sulfamate nickel strike to deposit nickel on aluminum in barrel plating of aluminum blanks. Certain prior processes use single zincate or double zincate, for example Morin as described above. The present inventors tried these two procedures but found that plating aluminum and aluminum alloys for coin applications, using single and double zincating is totally insufficient for adhesion. In order to understand the role of the triple zincate immersion process, surface morphology and microstructures of the zincate films at various zincating conditions were extensively studied. Aluminum samples, 55 mm×25 mm, 1.5 mm in size, were prepared and used for the tests. The samples were later examined by using a Scanning Electron Microscope (SEM) with an attached Energy Dispersive X-ray Spectrum (EDX).

The findings were further elaborated by using X-ray Photo Electron Spectroscopy (XPS) as detailed in Appendix A.

The Microstructure and Morphology of Zincating Layers

Figure 2:
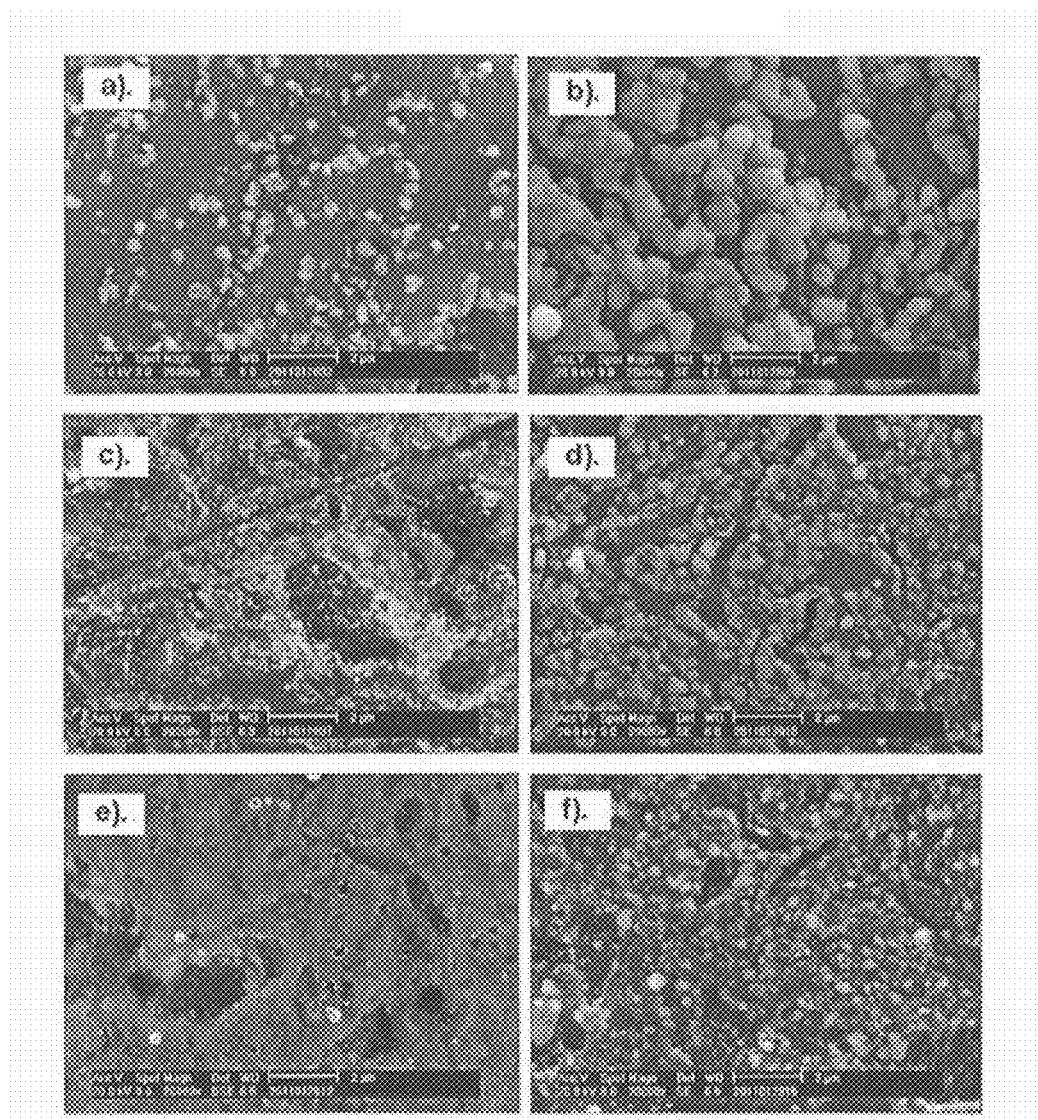
FIGS. 2a and 2b illustrate the surface morphology of zincating layer from a single zincate immersion.
FIGS. 2c and 2d illustrate the surface morphology of zincating layer from a double zincate immersion.
FIGS. 2e and 2f illustrate the surface morphology of zincating layer from a triple zincate immersion.

FIG. 2 shows the surface morphology of the zincating layers obtained from single, double and triple zincate immersion procedures, a) single zincate, 2 seconds; b) single zincate, 20 seconds; c) double zincate, 2 seconds; d) double zincate, 20 seconds; e) triple zincate, 2 seconds; d) triple zincate, 20 seconds. All the samples underwent several pre-treatment steps including soak clean (60° C., 3 minutes), acid etch (room temperature, 90 seconds) and desmutt (room temperature, 70 seconds).

Zincate immersion is a process whereby a thin layer of zinc is deposited onto an aluminum or aluminum alloy substrate. The substrate may be pre-cleaned. As mentioned previously, the zincating reaction is as follows:

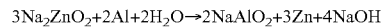

$$3Na_2ZnO_2+2Al+2H_2O \rightarrow 2NaAlO_2+3Zn+4NaOH$$

The resulting zinc oxidizes to form zinc oxide, resulting in a zinc-zinc oxide layer.

It is likely that the nuclei of zinc particles originate from where dissolution of aluminum takes place. Although pre-acidic etching removed aluminum oxides on the surface of the aluminum substrate, the substrate was not homogeneous in terms of electrochemical potentials. A flash re-oxidation would occur on the surfaces of aluminum substrates when the blanks were transferred to the zincating solution. As a result, in the first zincating, activated sites available for the nucleation of zinc were relatively few, and the Zn particles were deposited sparsely on the aluminum surface (FIG. 2a). Once nucleation of zinc took place in those sites, the growth of Zn particles would be relatively fast so that the zincating layer with large grains would be less dense and in fact would be porous. As a result, the single zincate immersion did not provide full coverage on the aluminum surface to be plated (FIG. 2b), and a considerable fraction of the aluminum surface was still exposed to air (FIG. 3a) as the Zn particles were relatively large in size, and the coating was less dense and actually was spongy. It was proven that plating on the thick and spongy zincating layer did not show acceptable adhesion and in fact, would result in plating failure due to poor adhesion.

Figure 3:
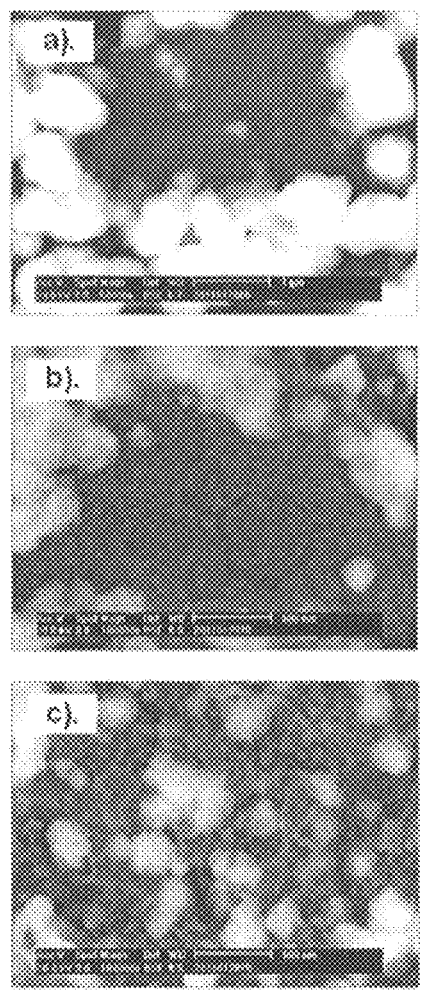
FIG. 3a is a high magnification SEM image of the zincating layer from a single zincate immersion.
FIG. 3b is a high magnification SEM image of the zincating layer from a double zincate immersion.
FIG. 3c is a high magnification SEM image of the zincating layer from a triple zincate immersion.
Figure 4:
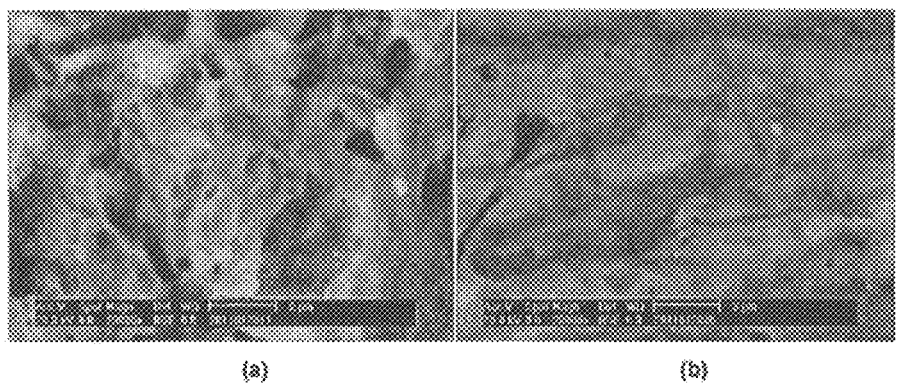
FIGS. 4a and 4b illustrate the surface morphology of an aluminum substrate following stripping of the zincating layer(s)

In the double zincate immersion, the spongy zincate deposits formed from the first zincate immersion step were stripped off in acidic solution. At the same time, the sites covered with aluminum oxide were etched and then activated due to the removal of the oxides under attack by the acidic stripping (FIG. 4a). The areas of aluminum surface covered by the first zincate deposits would have a delayed exposure to the stripping solution as the top zincating layers needed to be stripped off first. Once the zincate deposits were stripped off, these sites would then be in contact with stripping solution. However, the etching on these sites would be in much shorter time than the etching on those sites without zincating layers. This would create a favorable condition so as to have more homogeneous and activated sites for subsequent zincating, i.e., the 2nd zincating step. In other words, at the end of the first zincate stripping step, the aluminum substrate becomes more homogeneous in terms of electrochemical potential for the 2nd zincating step. As a result, more sites are available for nucleation of zinc, and the zinc particles were deposited more evenly on the aluminum surface. As the zinc grains grow, the zinc particles would become relatively smaller and the zincating layer would be denser. Based on the inventors' experimental work, the double zincating provided an increased coverage and protection film of zincate, and thus improved the adhesion of the subsequent metal, for instance, Ni plating. However, this improved coverage was yet to be sufficient in terms of plating adhesion for the coining application. The double zincate immersion still did not provide full coverage of zincate on the aluminum surface and some of the aluminum substrate was still exposed to air (FIG. 2c-d and FIG. 3b).

Double zincating was developed when it was intended to use basic copper cyanide or copper based cyanide as the first metallic strike layer to be deposited. It has proven totally insufficient when acidic plating baths are used to deposit the first metallic layer. Essentially, the third zincating provides a dense, uniform, complete coverage, which provides sufficient protection of aluminum substrate from being re-oxidized. The acid does not have direct instantaneous contact with the aluminum to dissolve it before galvanically plating the aluminum.

Therefore, a process which uses triple zincating achieves good adhesion of the metal plating onto aluminum parts. By stripping off the zincating layers from the second zincate immersion and submitting the substrate to a third zincate immersion, in a similar manner with the similar mechanism as the 2nd zincate immersion, even more sites were activated for nucleation of zinc particles. In fact, almost the entire surface of aluminum substrate was activated and the substrate became even more homogeneous than double zincate immersion (FIG. 4b). As the nucleation of zinc simultaneously took place evenly and densely on the substrate surface, a dense zinc layer formed with a much slower growth rate than during double zincate immersion. The resulting zincating layers were also much thinner. The thin and dense zinc oxide/zinc fully covered the aluminum substrate as protection layers (FIG. 2e-f and FIG. 3c). The full coverage of zincating layers on aluminum was confirmed by EDX analysis and XPS analysis.

Behavior of Zincating Layers in Nickel Strike Solution

Figure 5:
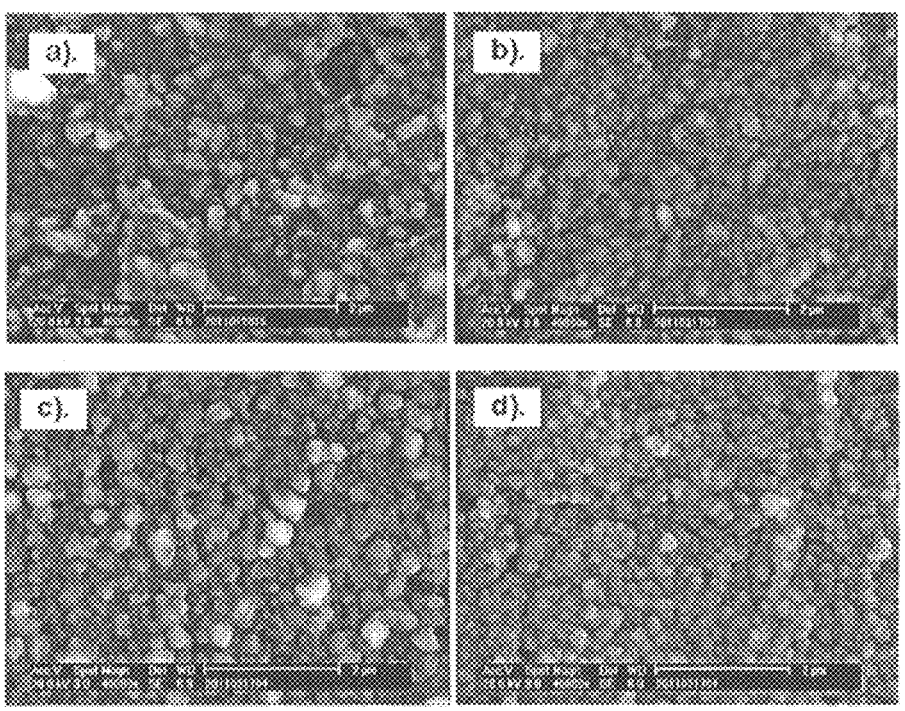
FIG. 5a-5d illustrate the surface morphology of zincating layer with varying zincating immersion duration.

It has been demonstrated that using a zincating layer formed by triple zincating which is dense and which fully covers the aluminum surface, prevents or mitigates re-oxidation in air and in the subsequent nickel strike solution. The thickness of the triple zincating film is also important. If it was too thick, zincating layers tended to become rough and spongy which is also detrimental to the adhesion of the subsequent plating to the aluminum substrate. As discussed previously, the optimal time duration for the third zincate immersion step was determined to be 15 seconds-60 seconds. When the third zincate immersion time was less than 15 seconds, the aluminum surface was not fully covered by the zincating layers, would not be protected from oxidation, and would result in poor adhesion. On the other hand, when the third zincate immersion time was longer than 60 seconds, the zincating layers were too thick and spongy (see FIG. 5c, d) and would not adhere well with the substrate, also resulting in poor coating adhesion.

The influence of different zincating time was also investigated in order to confirm the best range of zincating. Table 4 shows the detailed plating procedures and conditions.

TABLE 4

Barrel plating conditions of aluminum blanks (Al 5052 blanks, 200 pieces)

| Steps | Example 8 | Example 9 | Example 10 | Example 11 | Example 12 |
| --- | --- | --- | --- | --- | --- |
| Blank loadings | 200 pieces | 200 pieces | 200 pieces | 200 pieces | 200 pieces |
| Soak clean | 71° C., 5 min | 71° C., 5 min | 71° C., 5 min | 71° C., 5 min | 71° C., 5 min |
| Acid tech | 50 s | 50 s | 50 s | 50 s | 50 s |
| Desmutt | 50 s | 50 s | 50 s | 50 s | 50 s |
| 1st zincate | 45 s | 45 s | 45 s | 45 s | 45 s |
| 1st Zincate strip | 20 s | 20 s | 20 s | 20 s | 20 s |
| 2nd zincate | 30 s | 30 s | 30 s | 30 s | 30 s |
| 2nd zincate strip | 20 s | 20 s | 20 s | 20 s | 20 s |
| 3rd zincate | 15 s | 30 s | 60 s | 90 s | 120 s |
| Sulfamate nickel | 38° C, 0.6 A/dm$^2$, 90 min | 38° C, 0.6 A/dm$^2$, 90 min | 38° C, 0.6 A/dm$^2$, 90 min | 38° C, 0.6 A/dm$^2$, 90 min | 38° C, 0.6 A/dm$^2$, 90 min |
| Adhesion | Excellent | Excellent | Excellent | Good | Poor at edge |

It is seen that all testing conditions were the same but the zincating time was 15, 30, 60, 90 and 120 seconds. All the samples went through surface preparation, the triple zincating, and nickel plating. Each sample was then tested for adhesion by a bending test. The results show that the samples with zincating time of 15 to 60 seconds had excellent adhesion on the center and at the edge of the samples, however, the samples with 90 and 120 seconds or higher failed to show good adhesion.

Zincating Layers in the Nickel Strike Solution

Figure 6:
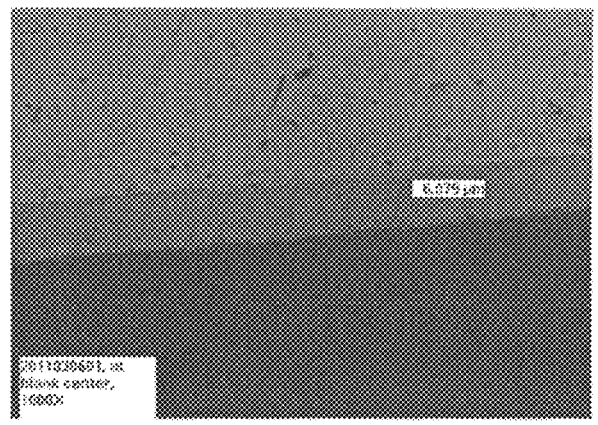
FIG. 6 is an optical cross section of the nickel plating on an aluminum substrate from a triple zincating process.
Figure 7:
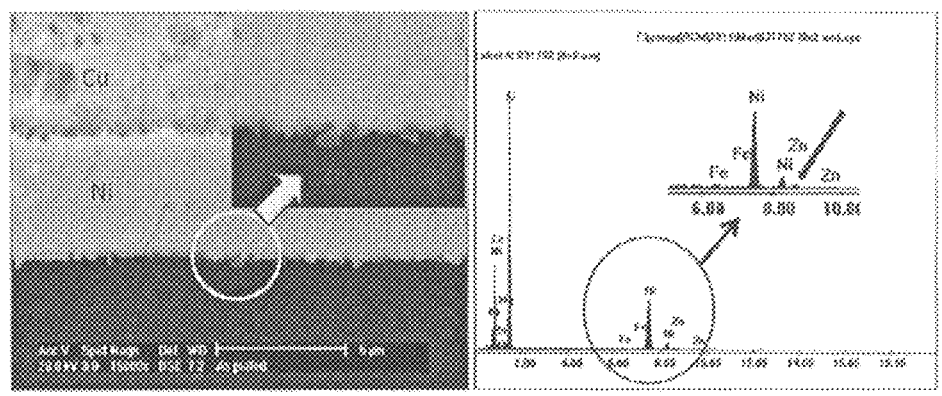
FIG. 7a is a high magnification SEM image of the nickel plating on an aluminum substrate from a triple zincating process.
FIG. 7b graphically illustrates the results of an EDX analyses of the nickel plating on an aluminum substrate from a triple zincating process.

It was of interest to know how the zincating layers behaved when the samples were transferred and immersed into the nickel strike solution. From the chemistry, it was known that zinc would dissolve in the nickel strike solution without applying electric current. This was also confirmed in the present work by using SEM/EDX analyses. In actual plating cycles, electric current was applied onto the blanks after a very short period of time, usually 10 seconds-20 seconds. There is a competing process between dissolution of zincating layer and deposition of nickel. It is likely that the majority of the zincating layers dissolved into the nickel solution and a small amount of zinc was left as a residue before they were covered by the nickel strike layer. From the cross section of the nickel plating on aluminum by using optical microscopy, no zincating layer was noticeably found on the interface between the nickel and aluminum, as shown in FIG. 6. However, the presence of zinc in the interface between the aluminum substrate and the nickel strike layer was found by using SEM/EDX, even for a very thin zincating layer (e.g., with 15 seconds during a third zincate immersion). FIG. 7 shows SEM and EDX analyses of the as-plated sample. As expected, the zinc content in the interface tends to increase as the zincate duration time increases.

A small amount of zinc may not have a negative impact on the adhesion of the nickel plating to the aluminum substrate, as confirmed by the bending tests. However, once the amount of residual zinc is over a certain limit, for example, when zincating time is more than 90 seconds, the adhesion becomes deteriorated. Not only does this result give a good indication of the benefit of the zincating layer and support the mechanism and importance of sufficient but not over zincating in order to achieve good adhesion, it also provides practical guidance when it comes to process control in production.

Coating Adhesion and Effect of Heat-Treatment

Morin does not describe post annealing treatment after plating and even recommends no heat treatment after plating (see column 10, line 62). Morin uses two zincating steps, cites no annealing and no burnishing as an advantage. The present work has, in one embodiment, introduced a post annealing process in order to relieve the internal stress of the plating mainly due to hydrogen brittleness and further improve bonding between post plated layer(s) and the substrate.

In one embodiment, after the electro plating, either with a mono-layer of nickel or copper, or copper alloys or another metal, or a multi-layer of nickel/copper/nickel, or different combinations of metals, the blanks are rinsed, dried and then loaded into an annealing furnace with a protective gas of nitrogen or mixed gases of nitrogen and hydrogen. The annealing temperature is between 400° C. to 450° C.

Figure 8:
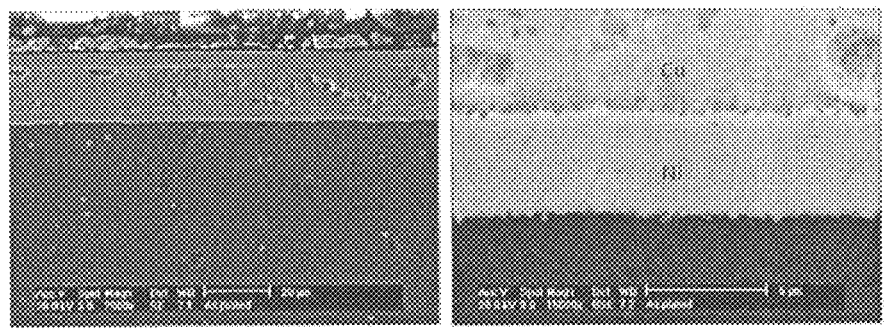
FIG. 8a-8c illustrate optical cross sections o the Al/Ni interfaces of nickel plating on an aluminum substrate at varying annealing temperatures.
Figure 8:
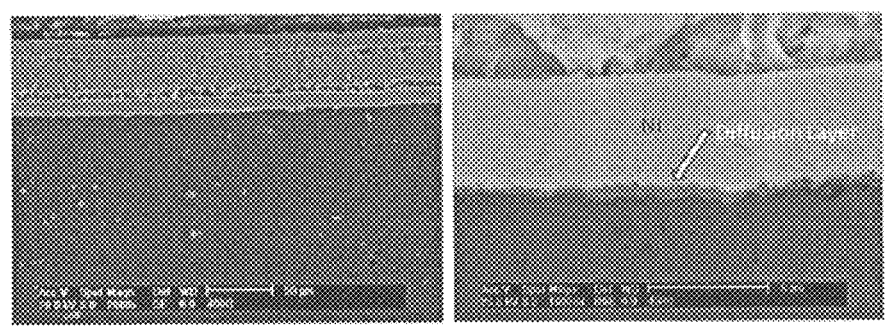
Figure 8:
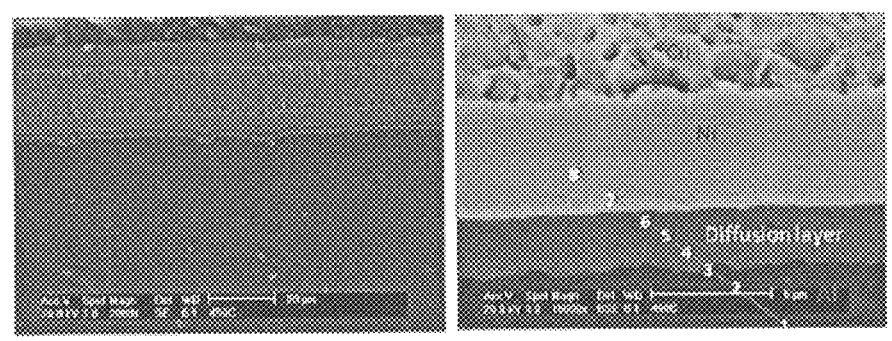

It has been found that an inter-diffused layer formed in the interface between the aluminum substrate and nickel strike plating upon the post annealing, as shown in the FIG. 8. From the extensive experiment, it was found that the diffusion layer could form as low as 400° C. at the current plating and post-annealing conditions. Depending upon the annealing temperature and the annealing time, the diffusion layer becomes thicker as expected. As shown in FIG. 8, the diffusion layer could reach 3 μm when the samples were annealed at 450° C. for 1 hour.

Figure 9:
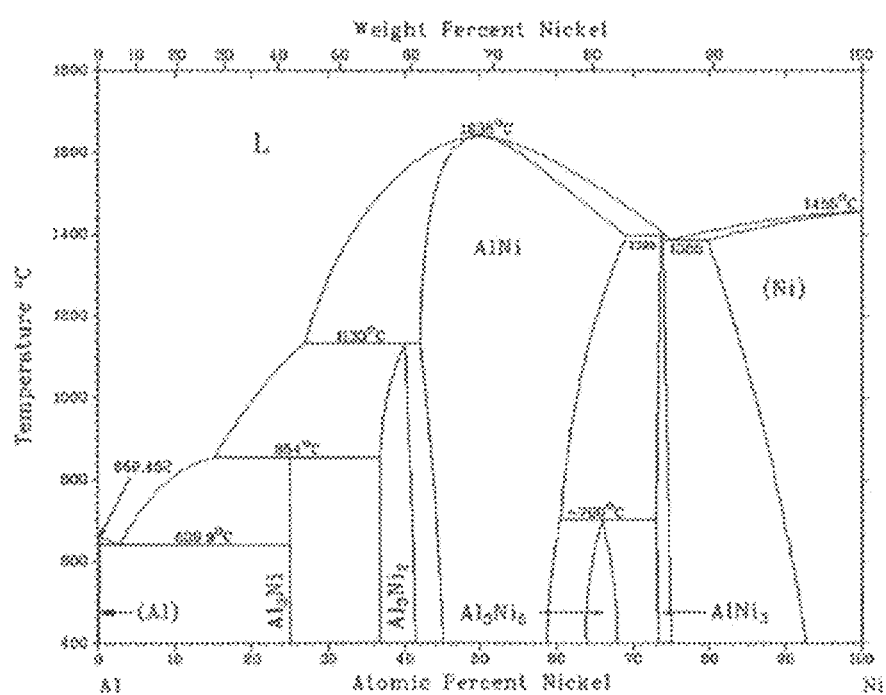
FIG. 9 is a Ni—Al binary phase diagram.

It is very likely that the diffusion between the aluminum, and the first plated metal resulted in a formation of the inter-metallic compounds. Depending upon the compositional gradients of the inter-diffusion in the interface between the aluminum and nickel layer, there might be different compounds. Point analysis rather than area analysis, using EDX, shows in Table 5, that there are two major compositional differences through the cross section, namely, 1) Al content 39.32 wt. % (or 58.5 at. %) and Ni content 60.68 wt. % (or 41.5 at. %), which is in a range pertaining to $Al_3Ni_2$ according the Ni—Al Phase Diagram in FIG. 9, and 2) Al content 52.91 wt. % (or 70.97 at. %) and Ni content 47.09 wt. % (or 29.03 at. %), which is in the range pertaining to $Al_3Ni$ according the Ni—Al Phase Diagram in FIG. 9.

TABLE 5

Compositional analysis at the cross section of the diffusion area corresponding to FIG. 8 (c) of the post annealed sample at 450° C.

| Spot | Weight composition (wt %) | | | Atomic composition (at %) | | |
|---|---|---|---|---|---|---|
| | Al | Mg | Ni | Al | Mg | Ni |
| 1 | 96.87 | 3.13 | 0 | 96.53 | 3.47 | 0 |
| 2 | 94.45 | 2.99 | 2.56 | 95.46 | 3.36 | 1.19 |
| 3 | 88.08 | 3.12 | 8.8 | 92.14 | 3.62 | 4.23 |
| 4 | 52.51 | 0 | 47.49 | 70.64 | 0 | 29.36 |
| 5 | 52.91 | 0 | 47.09 | 70.97 | 0 | 29.03 |
| 6 | 39.32 | 0 | 60.68 | 58.5 | 0 | 41.5 |
| 7 | 1.26 | 0 | 98.74 | 2.71 | 0 | 97.29 |
| 8 | 0.57 | 0 | 99.43 | 1.24 | 0 | 98.76 |

The formation of the diffusion layer with intermetallic compounds will significantly enhance the bonding of the plating to the substrate. The present work has provided strong evidence that formation of the intermetallic compound at low temperature diffusion, i.e., lower than the melting point of aluminum, is possible. The bending tests and coin striking tests have also demonstrated that excellent bonding was achieved by post annealing coin blanks.

Coining Performance

Figure 10:
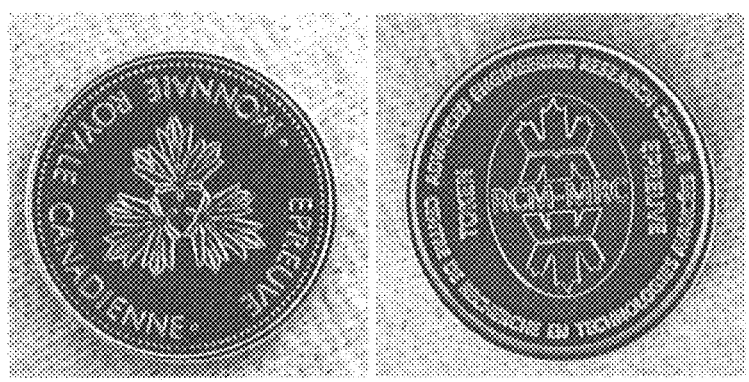
FIGS. 10a and b are photographs of coins struck from plated aluminum blanks.

Once the plated blanks were ready, the mintability of the plated aluminum blanks was tested by producing circulation coins using normal minting practices. The plated aluminum blanks were fed into the coining press with coining dies and collar set up to imprint the relief and edge serrations onto the plated blanks. As shown in FIG. 10, bright shiny coins in good circulation quality were obtained. The struck coins from plated aluminum blanks show very good appearance. Coining tests also confirmed that coins produced as described herein have excellent coating adhesion. In order to further verify the mintability and acceptance of the plated aluminum blanks for circulation coins, wear tests and corrosion tests were also performed after coining. The inventors noticed that if the plating was delaminated, cracked or broken from the substrate upon coining, wear tests and corrosion tests will also fail.

Wear Resistance

The objectives of the wear tests are as follows:
Evaluate wear performance of plated aluminum blanks/coins versus solid aluminum blanks/coins.
Evaluate wear performance of the plated aluminum coins in relation to the integrity of the plating to the substrate after coining.
Compare the wear performance of plated aluminum coins versus plated steel coins.

Figure 11:
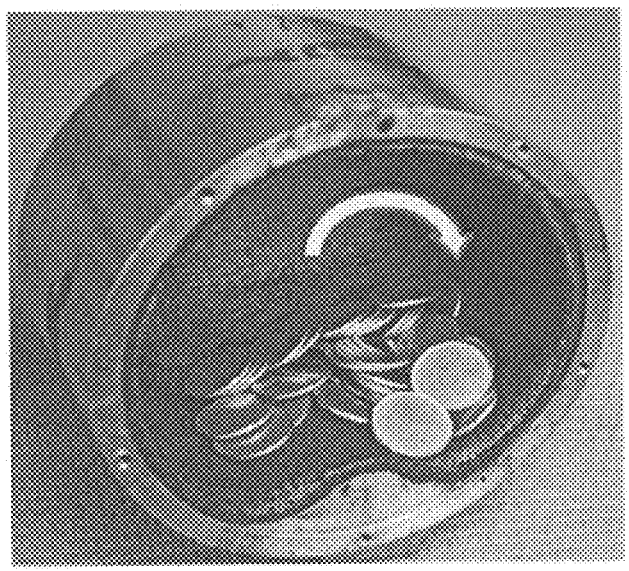
FIG. 11 illustrates a wear test apparatus.

Wear test apparatus and test conditions: The wear tests were done in a rotating drum with a smooth hump which separates, tumbles, slides the coins over one another at every revolution as the tumbler rotates. Coin to coin contact and impact is unavoidable. This is designed to replicate abuse of the coins in circulation, (See FIG. 11). The diameter of the tumbler is 12 cm. The inner wall of the drum is lined with rubber and cotton cloth. The rotation speed of the drum is fixed at 8 rpm.

Samples: Different circulation coins were used in the wear test for comparison. For a typical wear test, 50 coins were placed in the drum, including 10 pieces of mono-ply plated Ni/Al tokens made according to an embodiment of the present disclosure, 10 pieces of multi-ply plated Ni—Cu—Ni on Al tokens made according to another embodiment of the present disclosure, 10 pieces of regular multi-ply plated Ni—Cu—Ni on steel tokens, and 20 pieces of pure aluminum tokens. In order for the aluminum core tokens to have sufficient weight to turn over during the wear test, each plated aluminum token was carefully glued with an aluminum blank in order to make a double thick token having on one face pure aluminum and the other face the plated aluminum finish. The surfaces of tested samples were examined under optical microscope every 1 hour to assess the degree of the wear damage.

Figure 12:
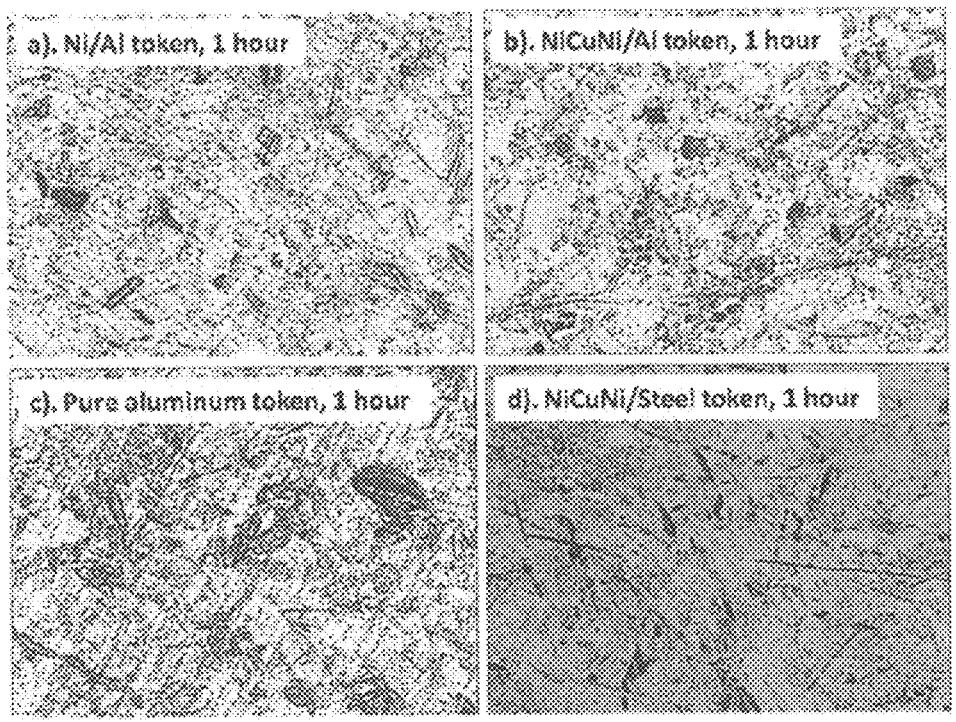
FIG. 12a-12d are optical images of wear-tested plated tokens.
Figure 13:
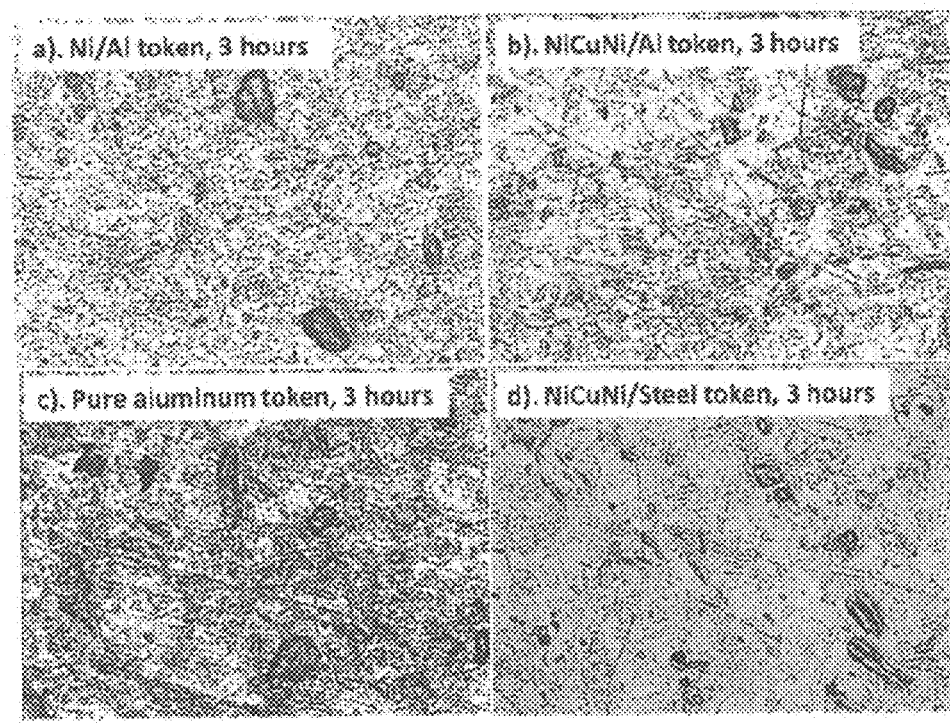
FIG. 13a-13d are optical images of wear-tested plated tokens.
Figure 14:
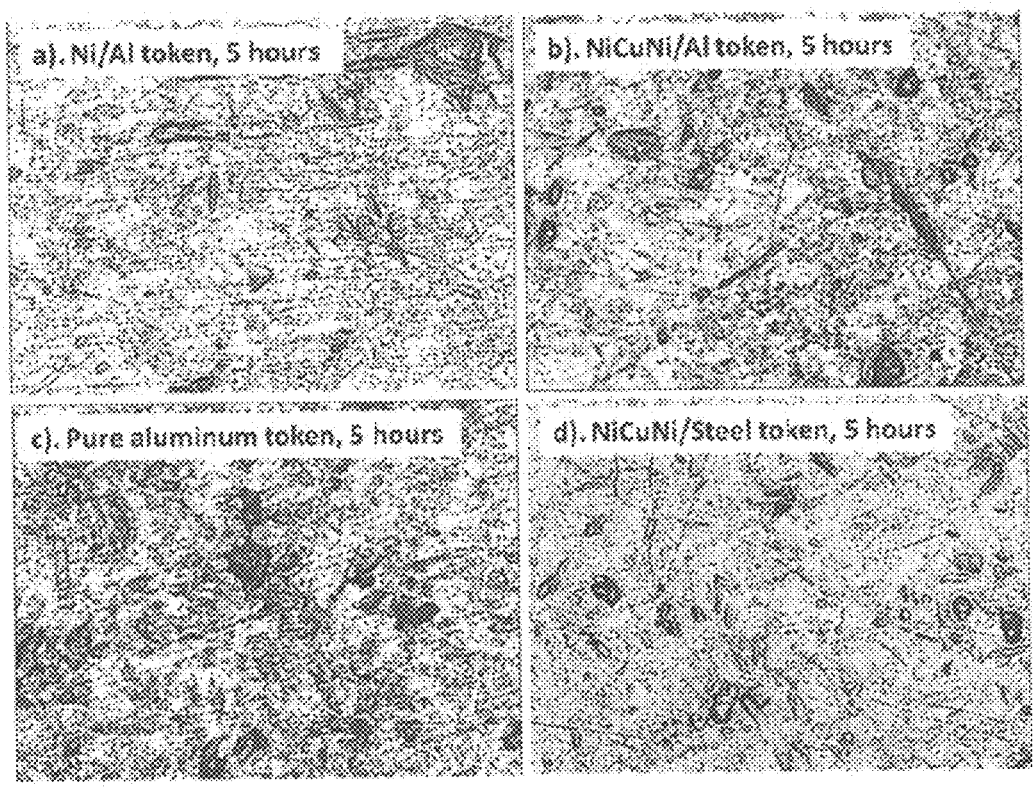
FIG. 14a-14d are optical images of wear-tested plated tokens.
Figure 15:
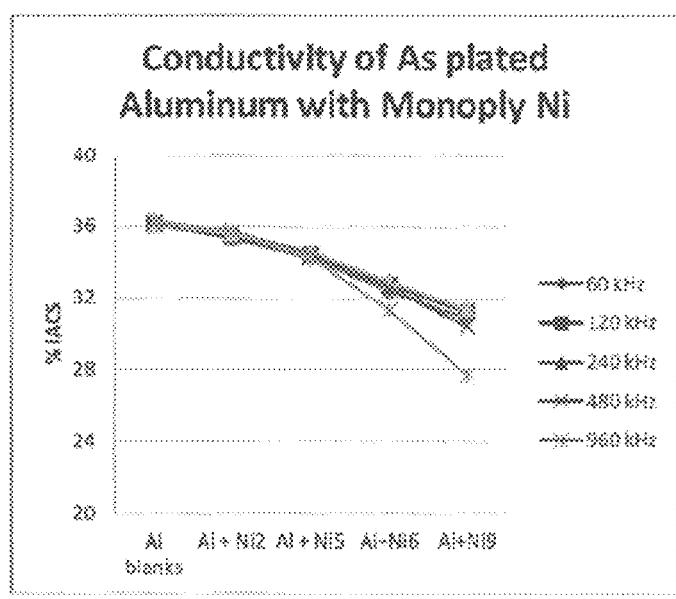
FIG. 15 graphically illustrates the conductivity of a plated aluminum substrate with mono-ply nickel plating.
Figure 16:
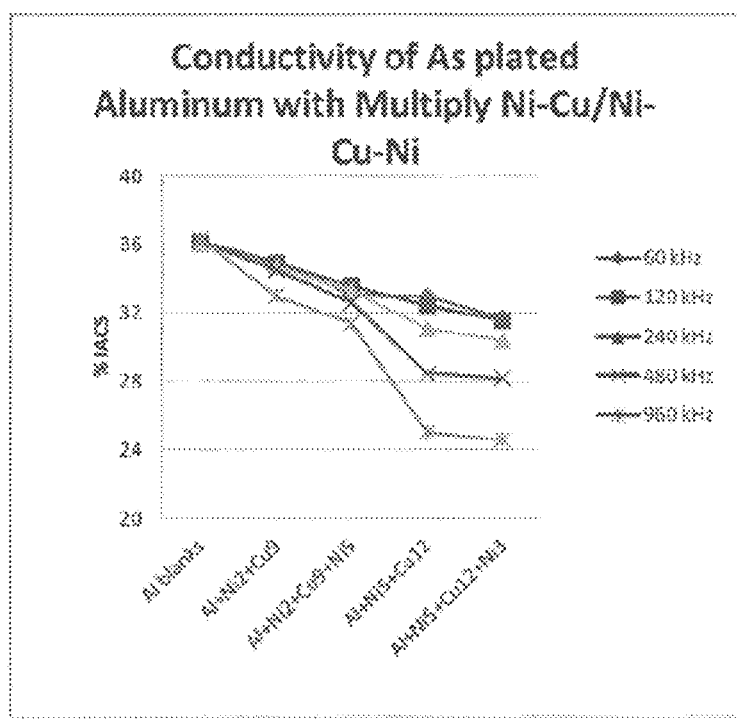
FIG. 16 graphically illustrates the conductivity of a plated aluminum substrate with multi-ply nickel-copper plating and nickel-copper-nickel plating.
Figure 17:
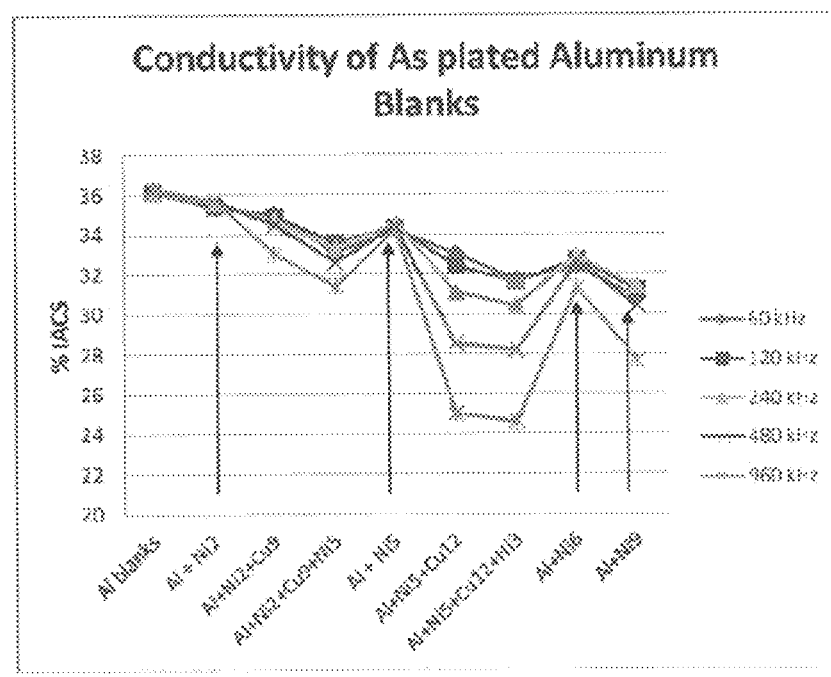
FIG. 17 graphically illustrates a comparison of different plating structures on the aluminum substrate.
Figure 18:
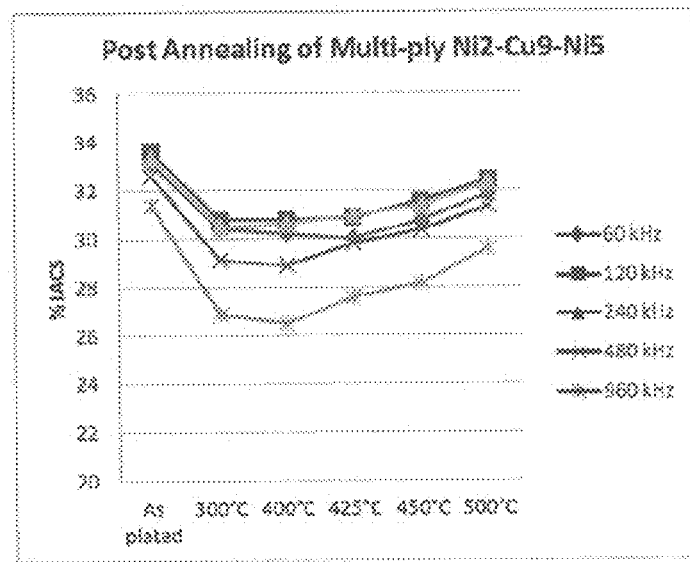
FIG. 18 graphically illustrates the conductivity behavior of plated aluminum substrate with multi-ply plating of $Ni_2Cu_9Ni_5$ post annealing at different temperatures.
Figure 19:
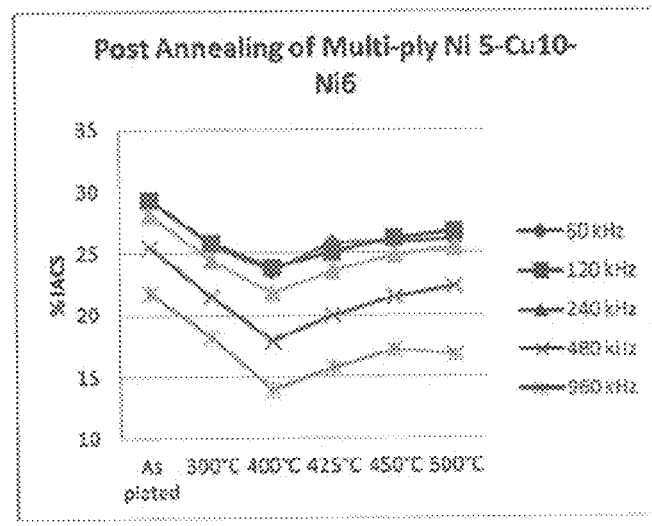
FIG. 19 graphically illustrates the conductivity behavior of plated aluminum substrate with multi-ply plating of $Ni_5Cu_{10}Ni_6$ post annealing at different temperatures.
Figure 20:
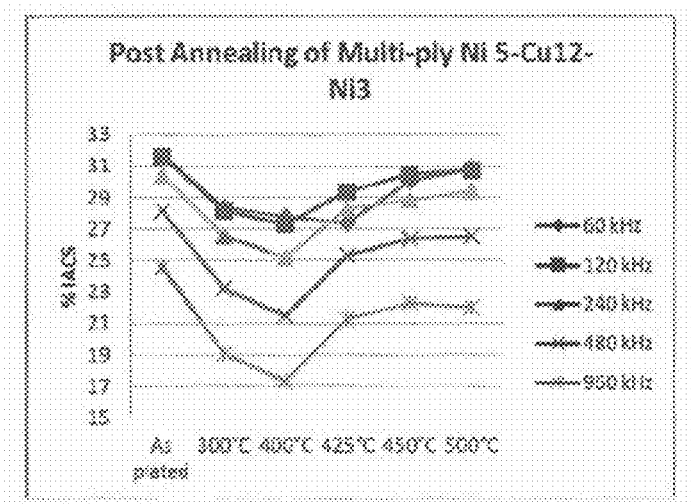
FIG. 20 graphically illustrates the conductivity behavior of plated aluminum substrate with multi-ply plating of $Ni_5Cu_{12}Ni_3$ post annealing at different temperatures.
Figure 21:
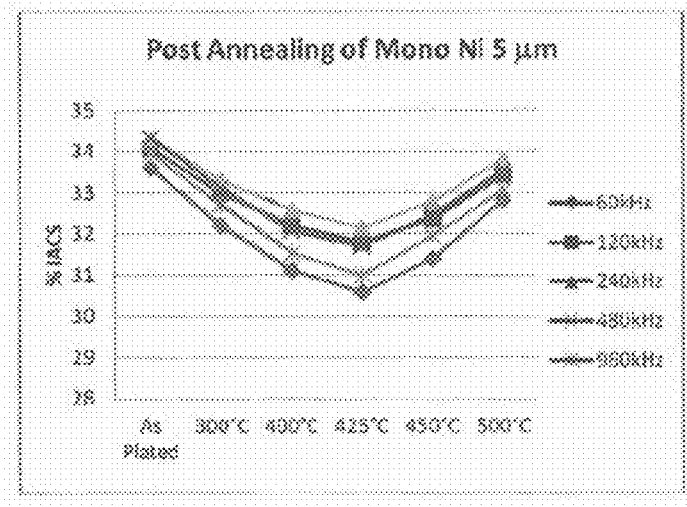
FIG. 21 graphically illustrates the conductivity behavior of plated aluminum substrate with mono-ply plating of $Ni_5Cu_{12}Ni_3$ post annealing at different temperatures.

Results and observations: The evaluation of wear resistance of the tested samples was based on the severity of the surface damage (e.g. dent and scratch formation) during the wear test as shown in FIGS. 12, 13, 14. The samples showing fewer dents under the same wear test conditions are deemed to have better wear resistance. In the initial test of 1 hour, there was no significant difference in the surface damage among all the samples, namely the mono-ply Ni/Al tokens (FIG. 12a), multi-ply NiCuNi/Al tokens (FIG. 12b), pure aluminum tokens (FIG. 12c) and multi-ply plated NiCuNi/steel tokens (FIG. 12d). Although the dents appear deeper and larger on the surface of aluminum token, no significant wear damage was observed. With longer wear test time, difference of surface damage started to show among the samples, and particularly the pure aluminum tokens showed more surface damages, as shown in FIG. 13 and FIG. 14. The other 3 kinds of plated materials, i.e., mono-ply plated Ni/Al tokens (FIGS. 13a and 14a) and multi-ply plated NiCuNi/Al tokens (FIGS. 13b and 14b) show better wear resistance than pure aluminum tokens (FIGS. 13c and 14c). As compared to multi-ply plated NiCuNi/steel tokens, the wear resistance of plated aluminum tokens is comparable and acceptable. Although the dents are deeper with the aluminum core tokens after 5 hours of the wear tests, the worn coins of plated blanks were all deemed acceptable. No detached or broken-up pieces were observed on the plated aluminum coins, suggesting that the integrity of the plating on the aluminum substrate was excellent and the coins of the mono-ply or multi-ply plating of aluminum substrates are acceptable for circulation.

Corrosion Resistance

The objective of the corrosion test is to evaluate if the plating still stay intact and provide full coverage without any crack upon striking. It is known that aluminum and its alloys would react with sodium hydroxide (NaOH) solution. Therefore, the plated aluminum would show corrosion signs such as reaction products of gas bubbles when the blanks are immersed in the solution, if the plating had any crack or break-ups on the struck coins. Furthermore, if there was corrosion due to the reaction of sodium hydroxide with aluminum, a white compound of aluminum hydroxide would appear at the crack.

NaOH solution testing: Blanks and struck coins were placed on a rack and completely submerged in a solution containing 1 M NaOH. These samples were observed and examined after one hour, 4 hours, 8 hours and 24 hours. Table 6 shows the observation and results. It is concluded that the plated aluminum coins and blanks made according to an embodiment of the present disclosure are superior and acceptable for circulation coins.

TABLE 6

Corrosion performance comparison

| Samples | Multi-ply plated aluminum blanks, annealed at 450° C. for 1 h, then burnished, 4 pieces | Multi-ply plated aluminum coins, annealed at 450° C. for 1 h, then burnished and struck, 3 pieces | Mono-ply plated Ni on aluminum blanks, no heat-treatment, 5 pieces |
|---|---|---|---|
| 4 hr | No obvious gas bubble presence | No obvious gas bubble presence | No obvious gas bubble presence |
| 8 hr | No obvious gas bubble presence | No obvious gas bubble presence | No obvious gas bubble presence |
| 24 hr | No color change and visible corrosion | No color change and visible corrosion | No color change and visible |

Additional Embodiments

The zincate immersion results in the creation of a very thin layer of zinc over the aluminum substrate according to the equation:

$$3Na_2ZnO_2 + 2Al + 2H_2O \rightarrow 2NaAlO_2 + 3Zn + 4NaOH.$$

The zinc is quickly converted to the more stable zinc oxide which is insoluble in water $Zn + \frac{1}{2}O_2 \rightarrow ZnO$.

This zincating (zinc-zinc oxide) layer, normally mistakenly known as the zinc layer, may be controlled for uniformity of size. Dense and compact formation is desired over coarse and large size to avoid (or limit) porosities which are venues of attack of the acidic, or neutral, non-cyanide plating bath. This layer may be covering completely the aluminum part to be plated for protection.

Live current to the plating barrel before entry to the first plating bath, whether acidic or basic (cyanide) is recommended to ensure (or assist) adhesion of the first plated layer of metal to the aluminum substrate.

In one embodiment, the process is performed without the use of nitric acid in any pre-treatment step, prior to plating the aluminum with one or more metal(s). Even without the use of nitric acid, results have shown that good adhesion of the plated metal layers to the aluminum substrate may be achieved.

In one embodiment, after plating with one or many layers of metal or metal alloys on the aluminum, annealing is carried out, for instance at 400° C. to 600° C., or at 425° C. and 450° C. to create a metallic diffusion between the aluminum, and other deposited metal such as nickel, copper, brass, or bronze, to enhance the adhesion of the plated metals to the aluminum substrate.

In one embodiment, pre-treatment of the aluminum includes, but is not necessarily limited to the following steps:
  Fabricate aluminum parts (e.g. coin blanks)
  Soak clean with degreasing and cleaning agents (for example, Alklean 11)
  Rinse
  Acid etch (no nitric acid) (for example, Alklean AC-2)
  Rinse
  Desmutt (no nitric acid) (for example, Desmutter NF2)
  Rinse
  First zincate immersion
  Rinse
  Second zincate stripping (no nitric acid)
  Rinse
  Second zincate immersion
  Rinse
  Second zincate stripping (no nitric acid)

Rinse
Third zincate immersion
Rinse
One or more additional zincating and stripping operations could also be performed.
Live entry to first plating bath (acid sulfamate nickel, or acid sulfate nickel, or cyanide copper, or neutral or basic copper)

In one embodiment, after the pre-treatment of the aluminum, the following operations may be performed, preferably without any cyanide plating baths. For example, a mono-layer or multi-layer plating operation could be prepared.

Mono-Layer:
Acid sulfamate nickel or acidic sulfate nickel or other non-cyanide plating (acid, basic, or neutral) baths.
Rinse
Post annealing Multi-Layer:
Acid sulfamate nickel strike or other non-cyanide plating (acid, basic, or neutral) baths.
Rinse
Cathodic activation of nickel
Rinse
Acid copper sulfate
Rinse
Copper plate activation
Rinse
Acidic sulfamate nickel or acidic sulfate nickel
Rinse
Post annealing In one embodiment, after the pre-treatment of the aluminum, the following plating operations may be performed in the presence of cyanide plating baths. For example, a mono or multi-layer plating operation could be performed.

Mono-Layer:
Cyanide copper or cyanide bronze or cyanide brass
Rinse
Post annealing Multi-Layer:
Cyanide copper or copper alloys or variations thereof with other cyanide plating material baths
Rinse
Acidic sulfamate nickel or acidic sulfate nickel
Rinse
Post annealing

APPENDIX "A"

Report on Analysis of Zincated Aluminum Surface Done by XPS

The photographs after the first zincating showed the presence of particles having a crystalline structure "stuck" to a metallic surface. After the first zincating, we see a lot of those particles on the surface, which may lead us to say that the surface is not dense, but after the third zincating, there are less of the particles on the metal surface, which led us to speak about a denser layer.

The equation $3\ Na_2ZnO_2 + 2\ Al + 2H_2O \rightarrow 2\ NaAlO_2 + 3\ Zn + 4NaOH$ is a stoichiometric equation showing how the components balance out exactly. It does not explain the mechanism by which Zn is on the surface.

The graphs are plotted from the result of an X-ray photo-electron spectroscopy. The samples are identified as (20110128) 05, (20110128)10, (20110128) 15.

| Zn | 27.75% |
|---|---|
| Al | 3.20% |
| Oxygen | 69.05% |

Sample 10, after second zincating:

| Zn | 27.9% |
|---|---|
| Al | 0.35 |
| O | 71.68 |

Sample 15, after third zincating:

| Zn | 27.34% |
|---|---|
| Al | 0.23% |
| O | 72.43% |

The X-ray photo-electron spectroscopy analyses elements at the surface (5 to 10 nanometers deep), shows exactly what is on the outmost layer and is accurate within 0.5%.

The above results lead the inventors to propose this mechanism which reflects what actually took place in order to give a layer of zincate which permitted the inventors to plate nickel on top.

The aluminum blanks were covered with aluminum oxide. On the first zincating, aluminum oxide was dissolved by the zincate solution and exposed active aluminum. The zinc oxide in the zincate solution displaces the active aluminum, replaces it and is stuck to the aluminum matrix (according to the above equation sodium aluminum oxide is now in solution). During the displacement, the zinc ion $(Zn^{++}(OH)^{2-})$ as zinc hydroxides or zinc hydroxo complexes such as $Zn(OH)^{-3}$, $Zn(OH)_4^-$ replaces the aluminum ion $Al^{+++}$.

By nature, zinc cannot exist as pure zinc for long. Freshly deposited zinc is quickly oxidized and forms zinc oxide. In the presence of a hydroxide, zinc oxide is formed which transforms to a zinc hydroxo complex with the zincating solution. These are the crystalline hexagonal particles (both zinc oxide and zinc are hexagonal) seen on the blank surface after the first zincating.

Upon zincate stripping, zinc oxide is dissolved by the acid, and part of the aluminum oxide, not dissolved during the first zincating, is also dissolved.

After the first stripping we have active zinc and a few sites of active aluminum.

On the second zincating, or just prior to the second zincating (since there is some precious time in the order of seconds) zinc is oxidized to zinc oxide, which transforms to a compound of zinc hydroxo complex with the zincating solution. (All zincating solutions have a complexing promoter agent which promotes zinc hydroxide to combine with iron hydroxide (and other metallic hydroxides) to facilitate the displacement of active aluminum.

On the second zincating, active aluminum sites are replaced by zinc. Now there are less aluminum sites. That is why the aluminum presence drops from 3.2% to 0.35% after the first zincating. This zinc is quickly oxidized to form zinc oxide. In the presence of a hydroxide in the zincating solution, zinc oxide is transformed to a zinc hydroxo complex which combines with iron hydroxide to make the complex more efficient to react at the active aluminum sites.

Upon stripping a second time by acid, the aluminum oxide becomes active aluminum sites and zinc oxide becomes active zinc.

On third zincating, zinc is deposited and then quickly oxidized to form zinc oxide when being removed from the zincating solution. In the presence of hydroxides in the third zincating, zinc oxide/zinc in the form of zinc hydroxo complex in the zincating solution replaces aluminum in the remaining active sites of aluminum.

This is the reason why we see less aluminum sites after the third zincating.

From the SEM picture obtained after the third zincating, we see that there are very few oxide particles, which underlines the fact that, the surface of aluminum is now covered with a thin layer of zinc, and zinc oxides. The active sites of aluminum are reduced to an atomic concentration of 0.23%.

By using acidic nickel plating after the third zincating tone can prevent (or mitigate) the thin layer of zinc from dissolving while in contact with the plating solution just prior to nickel plating.

In one embodiment, a nickel plating solution with a pH of 2.2 to 2.8 may be used. In one embodiment, the nickel plating solution is a nickel sulfamate plating formula.

In one embodiment, live current may be used to bring the plating barrel to the first acidic plating bath so that cathodic deposit takes place early in order to minimize the dissolution of zinc.

In one embodiment, aluminum alloys such as Al 1xxx series, Al 2xxx series, Al 3xxx series, Al 4xxx series, Al 5xxx series Al 6xxx series, Al 7xxx series, Al 8xxx series, and so on, may be used.

In one embodiment, the triple zincate can also apply to other metal or metal alloys, such as magnesium and its alloys.

In one embodiment, the plating materials may be copper, nickel, brass, bronze, cupro nickel alloy, or another metal or metal alloy.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

What is claimed is:

1. A method of treating a coin blank comprising an aluminum alloy, the method comprising:
   providing the coin blank comprising an aluminum alloy;
   depositing a first zincating layer on the coin blank by zincate immersion in a plating barrel;
   stripping off the first zincating layer;
   depositing a second zincating layer on the coin blank by zincate immersion in a plating barrel;
   stripping off the second zincating layer;
   depositing a third zincating layer on the coin blank by zincate immersion in a plating barrel;
   plating one or more layers of metal or metal alloys on the coin blank in the absence of cyanide; and
   annealing the plated coin blank at a temperature between 400 and 600° C. to create a metallic diffusion between the coin blank and the one or more plating layers to assist adhesion.

2. The method according to claim 1, wherein the one or more layers of metal or metal alloys comprise nickel, and plating the one or more layers comprises exposing the third zincating layer to an acidic, non-cyanide nickel sulfamate or sulfate plating solution.

3. The method according to claim 1, wherein plating the one or more layers of metal or metal alloys comprises barrel plating.

4. The method according to claim 1, wherein the plating is effected over an entire surface of the coin blank.

5. The method according to claim 1, further comprising, prior to plating, applying live current to a plating barrel to assist adhesion of a first plating layer to the coin blank.

6. The method of claim 1, wherein the annealing is effected between 425 and 450° C.

7. The method according to claim 1, wherein each immersion is effected for 10 to 120 seconds.

8. The method according to claim 1, wherein each immersion is effected for 15 to 60 seconds.

9. The method according to claim 1, further comprising, after depositing the third zincating layer, stripping off the third zincating layer, and depositing a fourth zincating layer on the coin blank by zincate immersion in a plating barrel.

* * * * *